(12) United States Patent  
Kazami

(10) Patent No.: US 6,289,178 B1  
(45) Date of Patent: Sep. 11, 2001

(54) ELECTRONIC CAMERA

(75) Inventor: Kazuyuki Kazami, Itabashi-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/244,344

(22) Filed: Feb. 10, 1999

(30) Foreign Application Priority Data

Mar. 10, 1998 (JP) .................................................. 10-058120

(51) Int. Cl.[7] ............................ G03B 17/00; H04N 5/262
(52) U.S. Cl. .............................................. 396/60; 348/240
(58) Field of Search ..................................... 348/240, 333, 348/334, 341; 396/60

(56) References Cited

U.S. PATENT DOCUMENTS 5,060,006 * 10/1991 Taniguchi et al. ...................... 396/60
5,557,328 * 9/1996 Ishihama et al. ................. 348/240 X

* cited by examiner

*Primary Examiner*—W. B. Perkey
(74) *Attorney, Agent, or Firm*—Oliff & Berridge, PLC

(57) ABSTRACT

An electronic camera includes: an image-capturing unit that creates an image by capturing an image of a subject; an enlarged image generating unit that creates an enlarged image by enlarging a portion of the image created by the image-capturing unit; an optical viewfinder that enables verification of a subject range corresponding to a range of the image created by the image-capturing unit; and a warning output unit that issues a warning when the enlarged image generating unit is in operation.

10 Claims, 6 Drawing Sheets

FUNCTIONAL BLOCK DIAGRAM OF ELECTRONIC STILL CAMERA

EXTERNAL VIEW OF ELECTRONIC STILL CAMERA

OPTICAL ZOOM IN PROGRESS

ELECTRONIC ZOOM IN PROGRESS

ELECTRONIC CAMERA

INCORPORATION BY REFERENCE

The disclosure of the following priority application is herein incorporated by reference:

Japanese Patent Application No. 10-58120, filed Mar. 10, 1998.

BACKGROUND OF THE INVENTION

1. Field of the Invention

The present invention relates to an electronic camera having an electronic zoom function whereby a portion of an image obtained by capturing an image of a subject is displayed in an enlargement and an optical viewfinder.

2. Description of the Related Art

There are single or fixed focus type electronic still cameras in the prior art that have a function of enlarging the central portion of an image created at an image-capturing element through image processing to obtain an image that appears as if it were photographed with a telephoto lens. Hereafter, this function is referred to as "electronic zoom."

It is to be noted that the enlarged image obtained through the electronic zoom may be displayed on, for instance, a liquid crystal display provided at the camera body of the electronic still camera.

In addition, some electronic still cameras that are provided with a zoom lens to perform optical zooming (hereafter referred to as "optical zoom") are also capable of achieving electronic zoom.

With such an electronic still camera, even when the zoom-in achieved through the optical zoom has reached its limit, for instance, an image that appears as if it were photographed at a focal length that is longer than the actual focal length can be created by implementing a zoom-in through the electronic zoom.

FIGS. 5A and 5B illustrate the relationship between the zooming and the focal length achieved through the optical zoom and the electronic zoom. In the figures, the "actual focal length" indicates the focal length determined through the optical zoom, whereas the "synthesized focal length" represents the focal length determined by combining the optical zoom and the electronic zoom.

Normally, an electronic still camera capable of optical zoom is provided with an optical zoom viewfinder at which the range of the subject within the viewfinder screen can be varied by moving the viewfinder lens.

However, since the range of the subject is changed in conformance to the actual focal length at the optical zoom viewfinder, the range of the subject within the viewfinder screen cannot be changed if the zoom-in achieved through the optical zoom has reached its limit, as illustrated in FIG. 5A.

In addition, as illustrated in FIG. 5B, if a zoom-in is implemented through the electronic zoom while a zoom-in through the optical zoom is in progress, it is difficult to move the viewfinder lens in conformance to the electronic zoom and, as a result, it is not possible to match the range of the subject within the viewfinder screen with the range of the subject displayed on a liquid crystal display or the like.

Thus, there is a concern that when the photographer performs photographing while monitoring the optical viewfinder, he may not realize that the electronic zoom is set and he may press the release button thinking erroneously that the image of the subject as seen in the viewfinder will be recorded.

In other words, there is a problem in that, in such a case, since the range of the subject, whose image is photographed while the electronic zoom is set, does not match the range of the subject within the viewfinder screen, an image that the photographer does not expect is recorded.

It is to be noted that electronic still cameras having an optical viewfinder (including an optical viewfinder without a zooming function) among the single focus type electronic still cameras described earlier, too, have a similar problem.

SUMMARY OF THE INVENTION

An object of the present invention is to provide an electronic camera capable of reducing photographing errors occurring as a result of the range of the subject in the viewfinder screen not matching the photographing range, and in particular, photographing errors resulting from the range of the subject in the viewfinder screen not matching the range of the subject displayed by a means for display.

In order to attain the above object, an electronic camera according to the present invention comprises: an image-capturing unit that creates an image by capturing an image of a subject; an enlarged image generating unit that creates an enlarged image by enlarging a portion of the image created by the image-capturing unit; an optical viewfinder that enables verification of a subject range corresponding to a range of the image created by the image-capturing unit; and a warning output unit that issues a warning when the enlarged image generating unit is in operation.

Another electronic camera comprises: an image-capturing unit that creates an image by capturing an image of a subject; an enlarged image generating unit that creates an enlarged image by enlarging a portion of the image created by the image-capturing unit; an optical viewfinder that enables verification of a subject range corresponding to a range of the image created by the image-capturing unit; a display unit that displays the image created by the image-capturing unit or the enlarged image created by the enlarged image generating unit; a decision-making unit that makes a decision as to whether or not the subject range within a viewfinder screen, which can be verified in the optical viewfinder, and a range of the subject displayed at the display unit match; and a warning output unit that issues a warning when the decision-making unit has decided that the subject range within the viewfinder screen and the range of the subject displayed at the display unit do not match.

In this case, preferably, the decision-making unit decides that the subject range within the viewfinder screen and the range of the subject displayed at the display unit do not match when the enlarged image created by the enlarged image generating unit is displayed on the display unit.

Also, preferably, the electronic camera further comprises a magnification power setting unit that accepts an external operation related to setting of a photographing magnification power at the image-capturing unit or setting of a magnification power to be used when the enlarged image generating unit creates an enlarged image, and the decision-making unit decides that the subject range in the viewfinder screen and the range of the subject displayed at the display unit do not match when a magnification power setting for creating an enlarged image is received via the magnification power setting unit.

In each of electronic cameras described above, preferably, the warning output unit issues a warning so that a photographer can be made aware the warning while verifying the subject range through the optical viewfinder. Also, preferably, the warning output unit implements display of the warning near the optical viewfinder.

DESCRIPTION OF THE PREFERRED EMBODIMENT

The following is a detailed explanation of an embodiment of the present invention in reference to the drawings.

Figure 1:
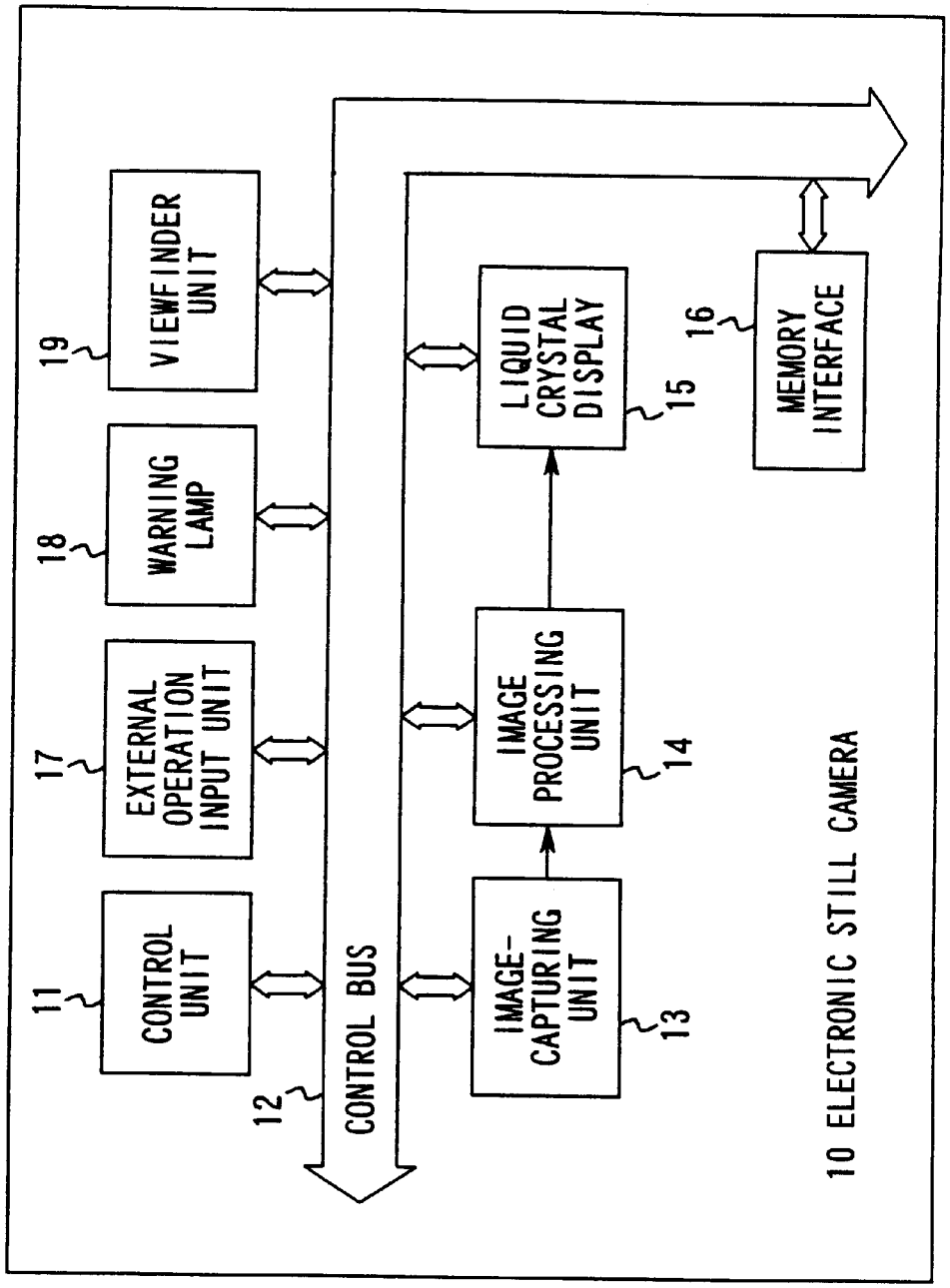
FIG. 1 is a functional block diagram of an electronic still camera.

FIG. 1 is a functional block diagram of an electronic still camera adopting the present invention.

Figure 2:
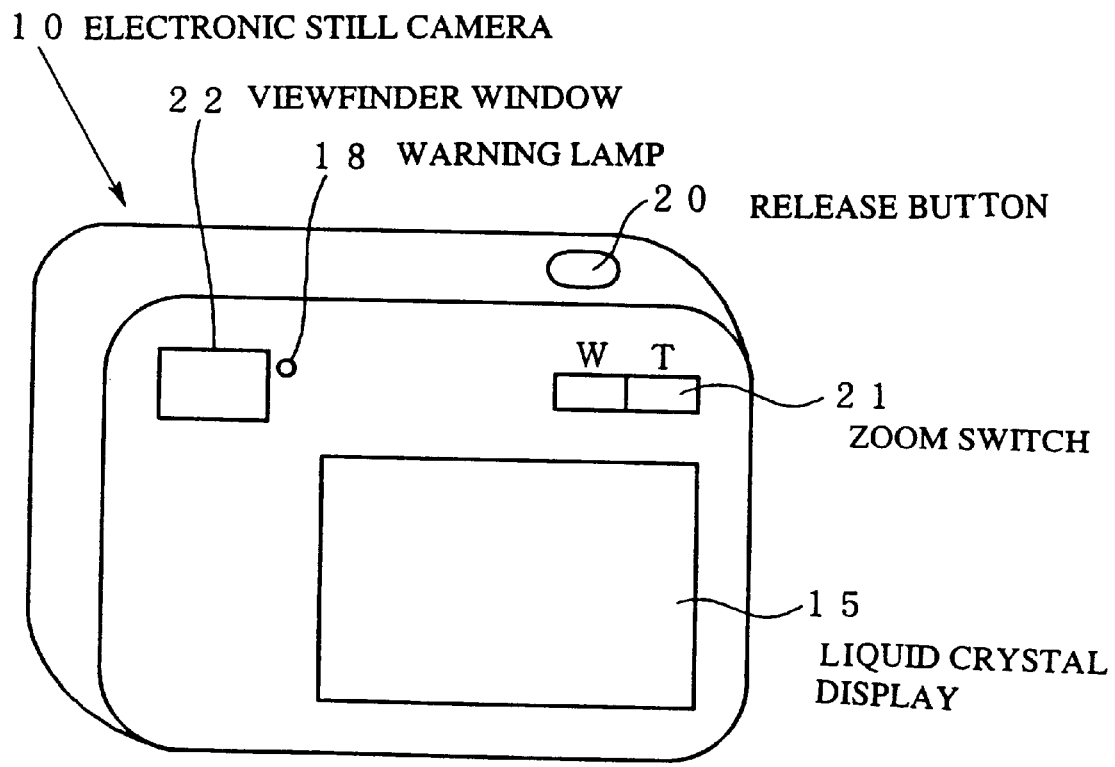
FIG. 2 shows an external view of the electronic still camera.

FIG. 2 is an external view of the electronic still camera adopting the present invention.

In FIG. 1, a control unit 11 within an electronic still camera 10 is connected to an image-capturing unit 13, an image processing unit 14, a liquid crystal display 15, a memory interface 16, an external operation input unit 17, a warning lamp 18 and a viewfinder unit 19 via a control bus 12.

In this embodiment, the external operation input unit 17 reads the "ON/OFF" state of a release button 20 and the setting status of a zoom switch 21, both shown in FIG. 2 and reports the readings to the control unit 11. It is to be noted that the focal length corresponding to the setting status of the zoom switch 21 is reported to the image-capturing unit 13, the viewfinder unit 19 and the like via the control unit 11.

The image-capturing unit 13, which is provided with a photographic lens and an image-capturing element (not shown), captures the image of a subject to create an image by driving the photographic lens in correspondence to the focal length indicated by the control unit 11.

The viewfinder unit 19, which is provided with a viewfinder lens (not shown), captures the image of the subject to create an image at the viewfinder screen by driving the viewfinder lens in correspondence to the focal length indicated by the control unit 11.

It is to be noted that the image created at the image-capturing unit 13 is provided to the image processing unit 14 to undergo the image processing that is to be detailed later, and is also displayed on the liquid crystal display 15 or is recorded in a recording medium such as a memory device via the memory interface 16 if the release button 20 is turned "ON". In addition, the image created at the viewfinder unit 19 is provided to the photographer via a viewfinder window 22 illustrated in FIG. 2.

Figure 3:
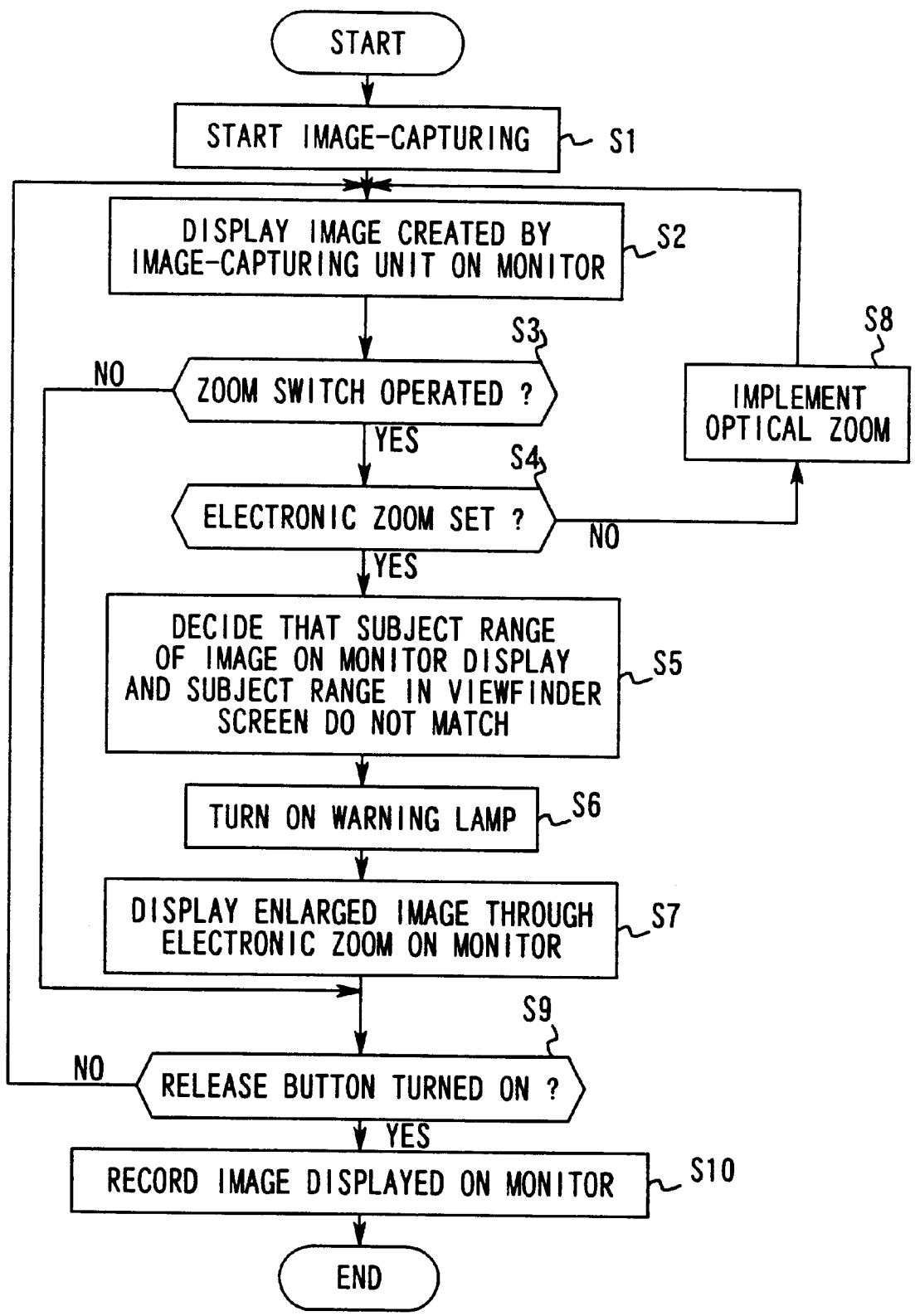
FIG. 3 is an operational flowchart of an embodiment.

FIG. 3 is a flowchart of the operation achieved in the embodiment.

The following is an explanation of the operation achieved in the embodiment given in reference to FIGS. 1~3.

When the main power is turned on, the control unit 11 issues instructions to the image-capturing unit 13 to create an image by capturing the image of the subject, and issues instructions to the image processing unit 14 and the liquid crystal display 15 to perform monitor display of the subject.

In response to these instructions, the image-capturing unit 13 starts to capture the image of the subject (FIG. 3, S1) and the image processing unit 14 performs image processing on the image created at the image-capturing unit 13 such as A/D conversion and gamma correction before providing the image to the liquid crystal display 15. In other words, the image created at the image-capturing unit 13 is displayed on the monitor (FIG. 3, S2).

It is to be noted that while such processing is in progress, the corresponding image is provided at the viewfinder screen and to the photographer via the viewfinder window 22, as explained earlier.

The control unit 11 constantly watches or monitors the state of the release button 20 and the setting status of the zoom switch 21 reported by the external operation input unit 17 as explained earlier, to make a decision as to whether or not the zoom switch 21 has been operated (FIG. 3, S3).

In addition, if it has been ascertained that the zoom switch 21 has been operated through such decision making, the control unit 11 makes a decision as to whether or not the electronic zoom is set (FIG. 3, S4).

It is to be noted that while various methods may be conceived for the photographer to set the electronic zoom, the electronic zoom is assumed to be set when the "T" side (telephoto side) of the zoom switch 21 has been pressed down for 2 seconds or more after the zoom-in through the optical zoom achieved by the image-capturing unit 13 has reached its limit, in this embodiment.

When it is ascertained at the control unit 11 that the electronic zoom is set, it decides that the range of the subject whose image is displayed on the monitor and the range of the subject in the viewfinder screen do not match (FIG. 3, S5), and the warning lamp 18 is turned on (FIG. 3, S6).

In addition, the control unit 11 reports the setting status of the zoom switch 21 reported by the external operation input unit 17 to the image processing unit 14. Also, it issues instructions to the image processing unit 14 and the liquid crystal display 15 to perform monitor display of an enlarged or magnified image through the electronic zoom.

In response to these instructions, the image processing unit 14 enlarges the image created at the image-capturing unit 13 in correspondence to the setting status of the zoom switch 21 and provides the enlarged image to the liquid crystal display 15. Thus, through this processing, the electronic zoom is implemented and the enlarged image is displayed on the monitor (FIG. 3, S7).

Now, if the electronic zoom is not set in a state in which the zoom switch 21 has been operated (FIG. 3, S4 NO), the control unit 11 ascertains that the optical zoom is set, and implements the optical zoom through the image-capturing unit 13 (FIG. 3, S8) and repeats the processing in S2 and the subsequent steps in FIG. 3.

In addition, based upon the state of the release button 20 and the setting status of the zoom switch 21 reported by the external operation input unit 17, the control unit 11 makes a decision as to whether or not the release button 20 has been turn on (FIG. 3, S9), and if it is ascertained that the release button 20 has been turn on, it issues instructions to the image processing unit 14 and the memory interface 16 to record the image. In response to these instructions, the image that is displayed on the monitor undergoes compression processing at the image processing unit 14 to be provided to the memory interface 16 where it is recorded in a recording medium such as a memory device (FIG. 3, S10).

As explained above, in this embodiment, when the electronic zoom is set via the zoom switch 21, an enlarged image is displayed on the liquid crystal display 15 and the warning lamp 18 provided near the viewfinder window 22 becomes lit.

With this, the photographer is notified that the electronic zoom is in progress and that the range of the subject within the viewfinder screen and the range of the subject displayed on the liquid crystal display 15 do not match, with a high degree of reliability.

Consequently, even when the photographer is operating the zoom switch 21 while monitoring the viewfinder window 22, he will be aware of the fact that the electronic zoom is in progress if the warning lamp 18 becomes lit so that he can verify the range of the subject by checking the image that is displayed on the liquid crystal display 15.

Figure 5A:
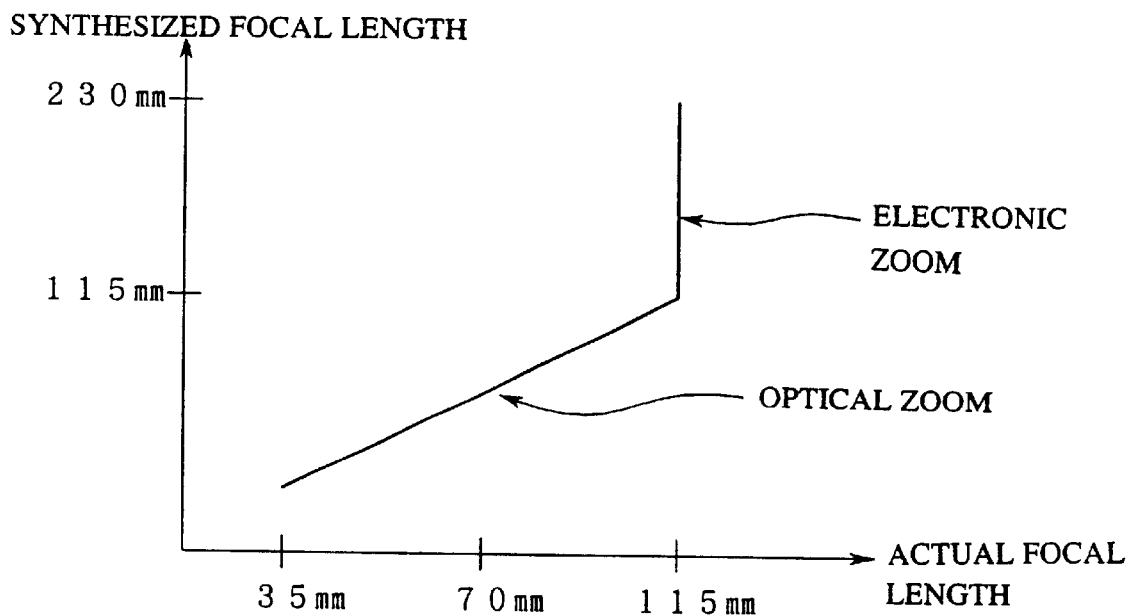
FIGS. 5A and 5B indicate the relationship between zooming and focal length.
Figure 5B:
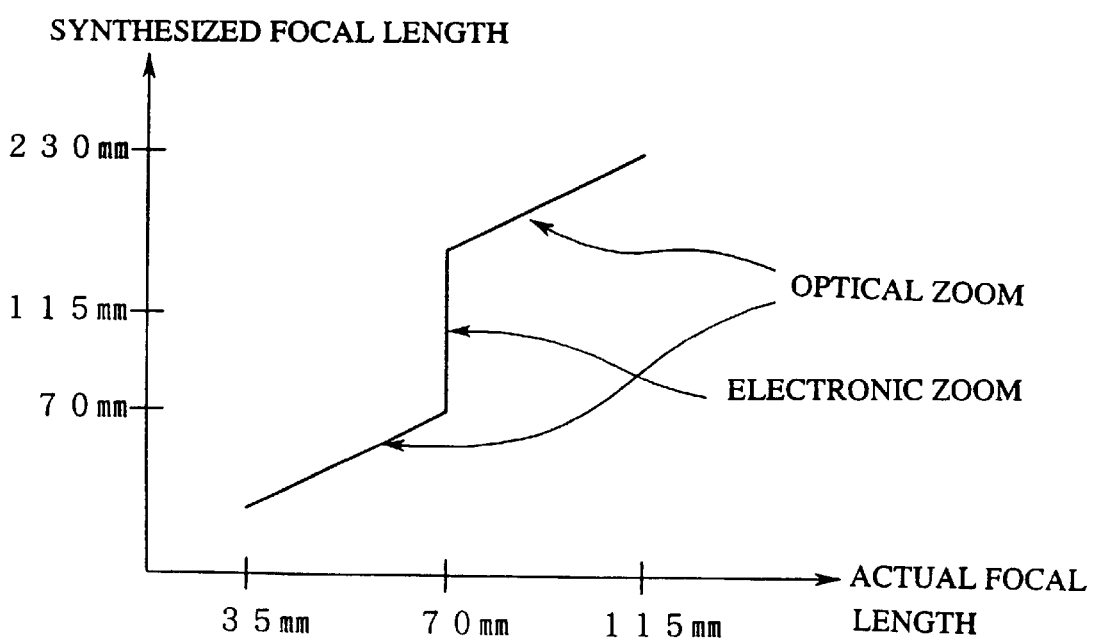

It is to be noted that while the electronic zoom is set when the zoom-in through the optical zoom has reached its limit in the embodiment, a separate operating switch for switching between the optical zoom and the electronic zoom may be provided (or an icon corresponding to a selector switch may be added in the operating screen in the case of an electronic still camera capable of displaying an operating screen on the liquid crystal display), to make it possible to set the electronic zoom even while the optical zoom is in progress, as illustrated in FIG. 5B.

However, with an electronic still camera in which the electronic zoom is set in this manner, it is necessary to warn that the range of the subject in the viewfinder screen does not match the range of the subject whose image is on monitor display even when the optical zoom is in progress after the electronic zoom has been implemented.

In addition, while the warning lamp 18 is provided in the vicinity of the viewfinder window 22 to issue a warning that the range of the subject within the viewfinder screen does not match the range of the subject whose image is on monitor display in this embodiment, if the present invention is adopted in an electronic still camera provided with a liquid crystal focusing screen within the viewfinder unit, for instance, a warning may be displayed on the focusing screen instead.

Figure 4A:
FIGS. 4A and 4B present examples of indices for indicating the focal length states.
Figure 4B:
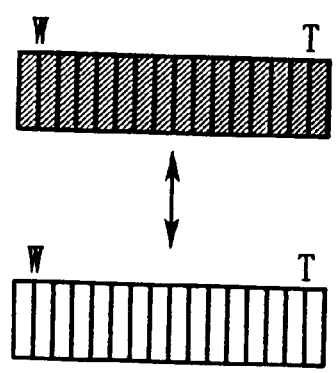

Now, while image processing is performed by the image processing unit 14 on an image created at the image-capturing unit 13, an index that indicates the focal length state, as illustrated in FIGS. 4A and 4B, for instance, may be superimposed on the image.

To be more specific, while the optical zoom is in progress, the shaded area is increased or reduced in response to the operation of the zoom switch 21 by the photographer, as illustrated in FIG. 4A, whereas when the electronic zoom is in progress after the optical zoom has reached its limit, an image with the shaded area blinking is superimposed.

It is to be noted that a warning that the range of the subject in the viewfinder screen does not match the range of the subject whose image is on monitor display may be issued by blinking a portion of, or the entirety of the index indicating the state of the focal length.

In addition, in the case of an electronic still camera in which the electronic zoom is set when the zoom-in through the optical zoom has reached its limit, as in the embodiment, the photographer may be notified that the electronic zoom is in progress instead of being issued with a warning, since, when the electronic zoom is in progress, the range of the subject within the viewfinder screen and the range of the subject whose image is on monitor display never match.

Furthermore, while the decision-making as to whether or not the range of the subject whose image is on monitor display and the range of the subject in the viewfinder screen match is implemented by making a decision as to whether or not the electronic zoom has been set via the zoom switch 21 in this embodiment, this decision making may be implemented by making a decision as to whether or not an enlarged image is on display.

For instance, the image processing unit 14 may decide that the range of the subject whose image is on monitor display and the range of the subject in the viewfinder screen do not match and issue a warning, when the control unit 11 issues instructions to create an enlarged image to the image processing unit. Moreover, an image that is equivalent to a warning display (e.g., a message such as "Electronic zoom in progress!!") may be superimposed on the enlarged image.

While the explanation is given above in reference to the embodiment by using an electronic still camera as an example, the present invention is not restricted to be adopted in an electronic still camera. For instance, the contents of the present invention may be adopted in a video camera handling motion pictures. In other words, the present invention may be adopted in all types of electronic cameras provided with both an optical viewfinder and an electronic zoom function.

While the explanation is given above in reference to the embodiment on the warning issued through the warning lamp 18 or through display on the liquid crystal focusing screen, i.e., on an example in which the warning is visually recognized, it may be recognized by sound, such as with a buzzer.

Figure 6:
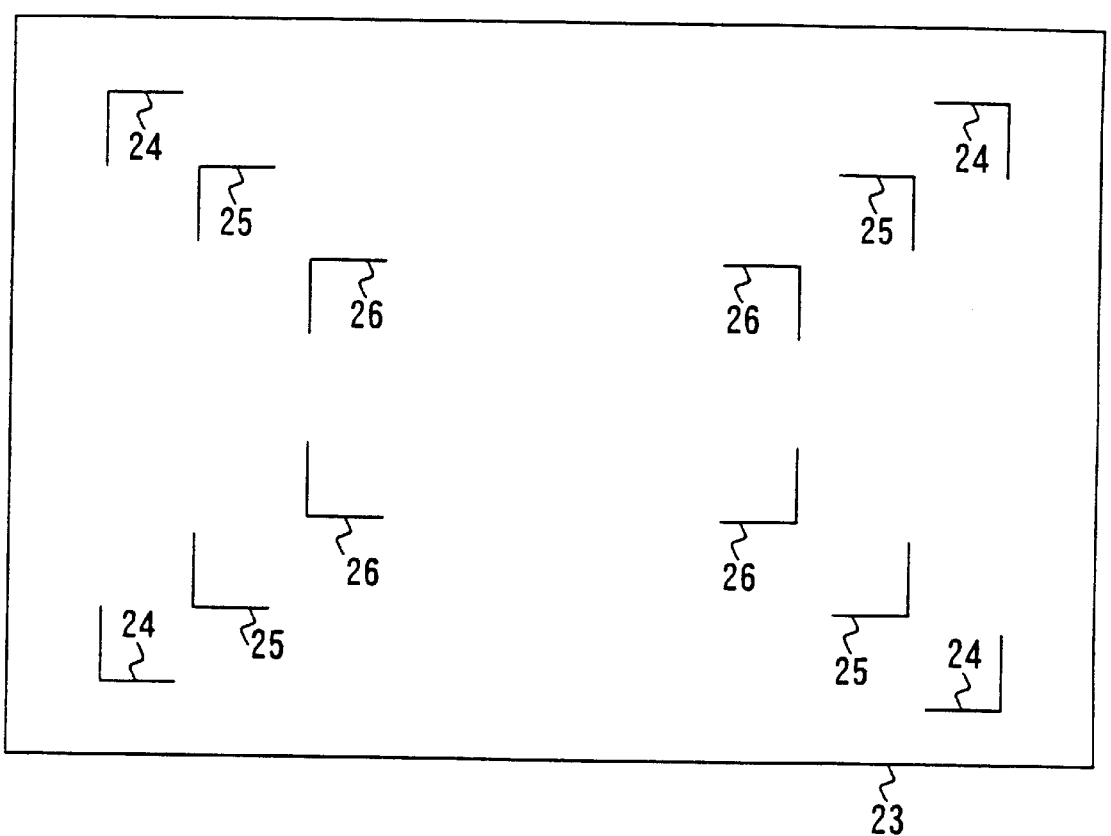
FIG. 6 shows an example of a liquid crystal display within the optical viewfinder.

In reference to the embodiment, the explanation is given above on an example in which the warning is issued in regard to whether or not the electronic zoom is set or in regard to the subject range of image on monitor display and the subject range that can be seen via the optical viewfinder not matching. When such a warning is issued, display may be implemented to make it possible to ascertain the degree of enlargement or magnification achieved through the electronic zoom, as well. For instance, display that enables verification of the range over which enlargement processing is being performed through the electronic zoom may be provided on the liquid crystal display within the optical viewfinder. FIG. 6 shows an example of such a liquid crystal display within the optical viewfinder. A frame 24, 25 or 26 that indicates the subject range in which the electronic zoom is being performed may be superimposed on liquid crystal display or the like within a subject range 23 seen through the viewfinder window 22. When the frame 25 is displayed, for instance, the subject range corresponding to the frame 25 is enlarged through the electronic zoom. In addition, when the frame 26 among the frames 24, 25 and 26 is displayed, the power of magnification or the factor of enlargement achieved by the electronic zoom is at its maximum.

What is claimed is:

1. An electronic camera comprising:

an image-capturing unit that creates an image by capturing an image of a subject;

an enlarged image generating unit that creates an enlarged image by enlarging a portion of the image created by said image-capturing unit;

an optical viewfinder that enables verification of a subject range corresponding to a range of the image created by said image-capturing unit;

a display unit that displays at least one of the image created by said image-capturing unit and the enlarged image created by said enlarged image generating unit; and a warning output unit that issues a warning when said enlarged image generating unit is in operation.

2. An electronic camera according to claim 1, wherein:

said warning output unit issues a warning so that a photographer can be made aware of the warning while verifying the subject range through said optical viewfinder.

3. An electronic camera according to claim 2, wherein:
said warning output unit implements display of the warning near said optical viewfinder.

4. An electronic camera according to claim 1, wherein:
said warning output unit issues the warning on said display unit.

5. An electronic camera comprising:
an image-capturing unit that creates an image by capturing an image of a subject;
an enlarged image generating unit that creates an enlarged image by enlarging a portion of the image created by said image-capturing unit;
an optical viewfinder that enables verification of a subject range corresponding to a range of the image created by said image-capturing unit;
a display unit that displays the image created by said image-capturing unit or the enlarged image created by said enlarged image generating unit;
a decision-making unit that makes a decision as to whether or not the subject range within a viewfinder screen, which can be verified in said optical viewfinder, and a range of the subject displayed at said display unit match; and
a warning output unit that issues a warning when said decision-making unit has decided that the subject range within said viewfinder screen and the range of the subject displayed at said display unit do not match.

6. An electronic camera according to claim 5, wherein:
said decision-making unit decides that the subject range within said viewfinder screen and the range of the subject displayed at said display unit do not match when the enlarged image created by said enlarged image generating unit is displayed on said display unit.

7. An electronic camera according to claim 5, further comprising:
a magnification power setting unit that accepts an external operation related to setting of a photographing magnification power at said image-capturing unit or setting of a magnification power to be used when said enlarged image generating unit creates an enlarged image, wherein:
said decision-making unit decides that the subject range in said viewfinder screen and the range of the subject displayed at said display unit do not match when a magnification power setting for creating an enlarged image is received via said magnification power setting unit.

8. An electronic camera according to claim 5, wherein:
said warning output unit issues a warning so that a photographer can be made aware the warning while verifying the subject range through said optical viewfinder.

9. An electronic camera according to claim 8, wherein:
said warning output unit implements display of the warning near said optical viewfinder.

10. An electronic camera according to claim 5, wherein:
said warning output unit issues the warning on said display unit.

* * * * *